US012633032B2

(12) United States Patent
Ivanovic et al.

(10) Patent No.: US 12,633,032 B2
(45) Date of Patent: May 19, 2026

(54) SINGLE MIP FILTERING WITH BANDWIDTH CONTROL

(71) Applicants:Advanced Micro Devices, Inc., Santa Clara, CA (US); ATI Technologies ULC, Markham (CA)

(72) Inventors: Boris Ivanovic, Markham (CA); Guennadi Riguer, Markham (CA); Michał Adam Woźniak, Santa Clara, CA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 172 days.

(21) Appl. No.: 18/477,386

(22) Filed: Sep. 28, 2023

(65) Prior Publication Data

US 2025/0111582 A1    Apr. 3, 2025

(51) Int. Cl.
*G06T 15/04*         (2011.01)
*G06T 15/00*         (2011.01)
(52) U.S. Cl.
CPC ............ *G06T 15/04* (2013.01); *G06T 15/005* (2013.01); *G06T 2210/36* (2013.01)
(58) Field of Classification Search
None
See application file for complete search history.

(56)              References Cited

U.S. PATENT DOCUMENTS

| | | | | |
|---|---|---|---|---|
| 9,934,606 | B2 * | 4/2018 | Sathe ...................... | G06T 15/80 |
| 2006/0119599 | A1 * | 6/2006 | Woodbury, Jr. ........ | G06T 15/04 |
| | | | | 345/582 |
| 2017/0206700 | A1 * | 7/2017 | Munkberg ............ | G06T 15/005 |
| 2021/0118196 | A1 * | 4/2021 | King ...................... | G06T 15/04 |
| 2021/0241502 | A1 * | 8/2021 | Thurston, III ........ | G06T 11/001 |
| 2023/0050686 | A1 * | 2/2023 | King ......................... | G06T 7/40 |
| 2023/0050797 | A1 * | 2/2023 | King ......................... | G06T 7/60 |
| 2025/0106355 | A1 * | 3/2025 | Luo ........................ | G06T 7/579 |

OTHER PUBLICATIONS

Andersson, M., Hasselgren, J., Toth, R., & AkenineâMÃ¶ler, T. (May 2014). Adaptive texture space shading for stochastic rendering. In Computer Graphics Forum (vol. 33, No. 2, pp. 341-350). (Year: 2014).*
McCormack, J., Perry, R., Farkas, K. I., & Jouppi, N. P. (Jul. 1999). Feline: fast elliptical lines for anisotropic texture mapping. In Proceedings of the 26th annual conference on Computer graphics and interactive techniques (pp. 243-250).*
Wikipedia, "Gaussian Filter," downloaded from https://en.wikipedia.org/wiki/Gaussian_filter on Sep. 22, 2023, 4 pgs.

* cited by examiner

*Primary Examiner* — Ryan M Gray
(74) *Attorney, Agent, or Firm* — Volpe Koenig

(57)              ABSTRACT

A technique for rendering is provided. The technique includes determining a level of detail for a shade space texture and a screen space; shading the shade space texture having a resolution based on the level of detail; and for a reconstruction operation, performing sampling from the shade space texture, the sampling including a high frequency attenuation of samples of the shade space texture.

20 Claims, 9 Drawing Sheets

100

Interconnect 112

Processor 102

Auxiliary Device(s) 106

Auxiliary Processor(s) 114

APD 116

IO Devices 117

Memory 104

Storage 108

400
Visibility Pass and Texture Marking 402 → Shade Space Shading 404 → Reconstruction 406
Figure 4
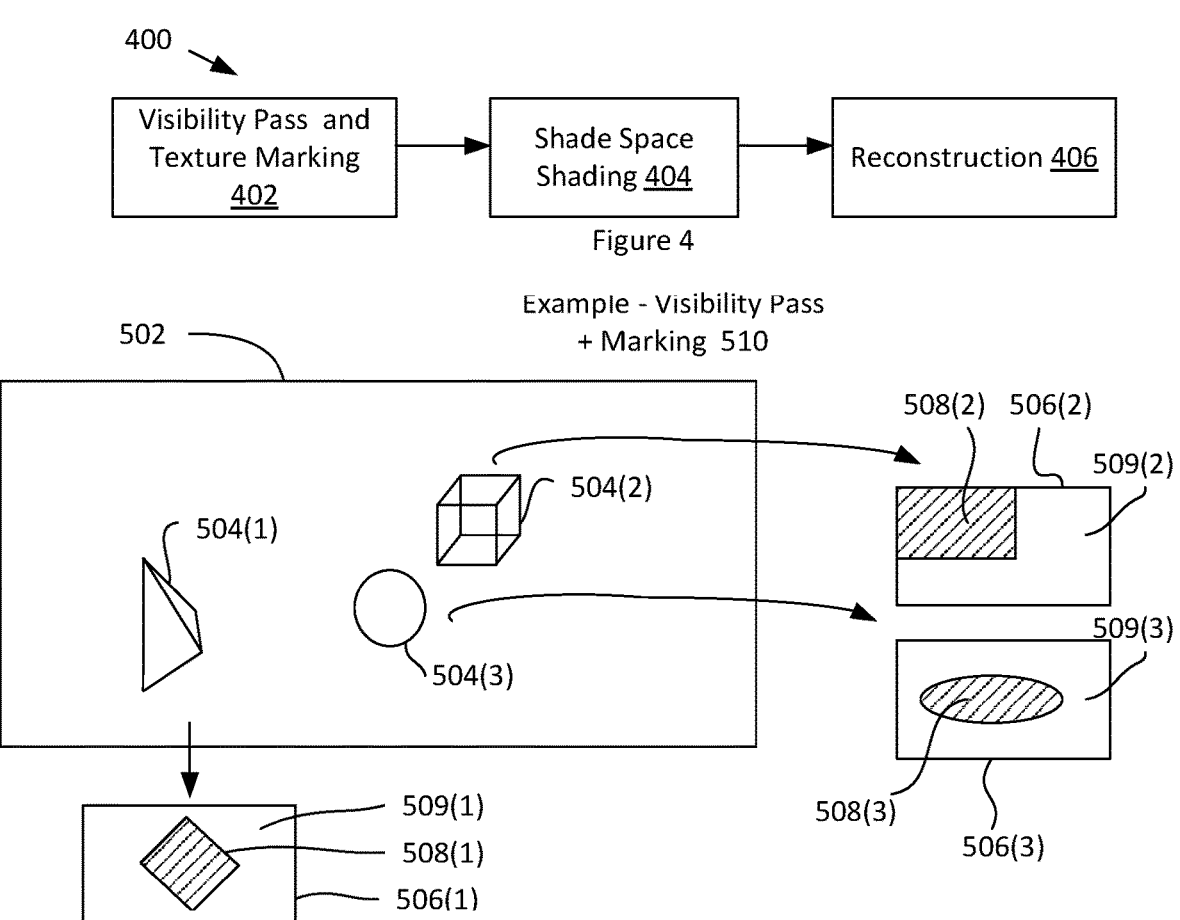
Example - Visibility Pass + Marking 510
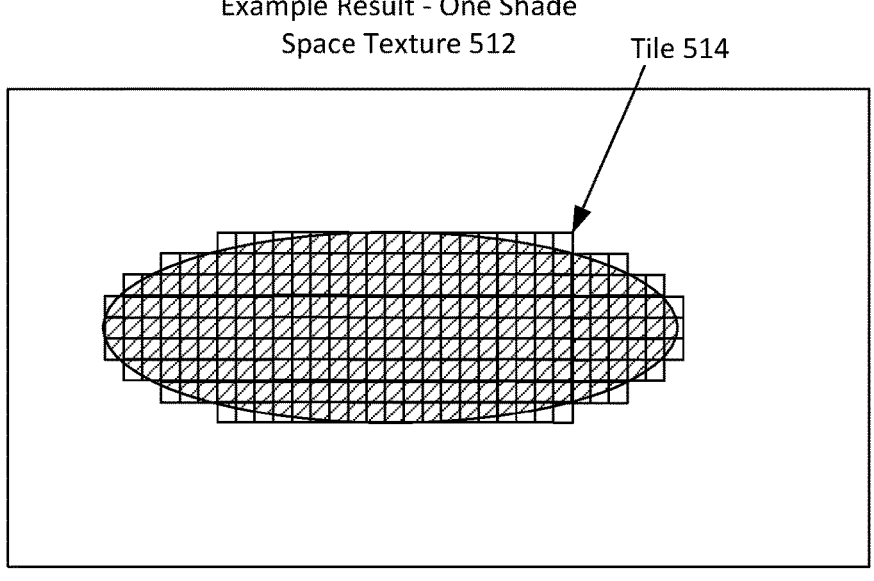
Example Result - One Shade Space Texture 512
Tile 514
Figure 5

Shade Space Shading
600

Reconstruction 700

SINGLE MIP FILTERING WITH BANDWIDTH CONTROL

BACKGROUND

Three-dimensional graphics processing involves rendering three-dimensional scenes by converting models specified in a three-dimensional coordinate system to pixel colors for an output image. Improvements to three-dimensional graphics processing are constantly being made.

BRIEF DESCRIPTION OF THE DRAWINGS

A more detailed understanding may be had from the following description, given by way of example in conjunction with the accompanying drawings wherein:

FIG. 4 illustrates a set of decoupled shading operations, according to an example;

FIG. 5 illustrates operations for the visibility pass and texture marking operations, according to an example;

DETAILED DESCRIPTION

A technique for rendering is provided. The technique includes determining a level of detail for a shade space texture and a screen space; shading the shade space texture having a resolution based on the level of detail; and for a reconstruction operation, performing sampling from the shade space texture, the sampling including a high frequency attenuation.

Figure 1:
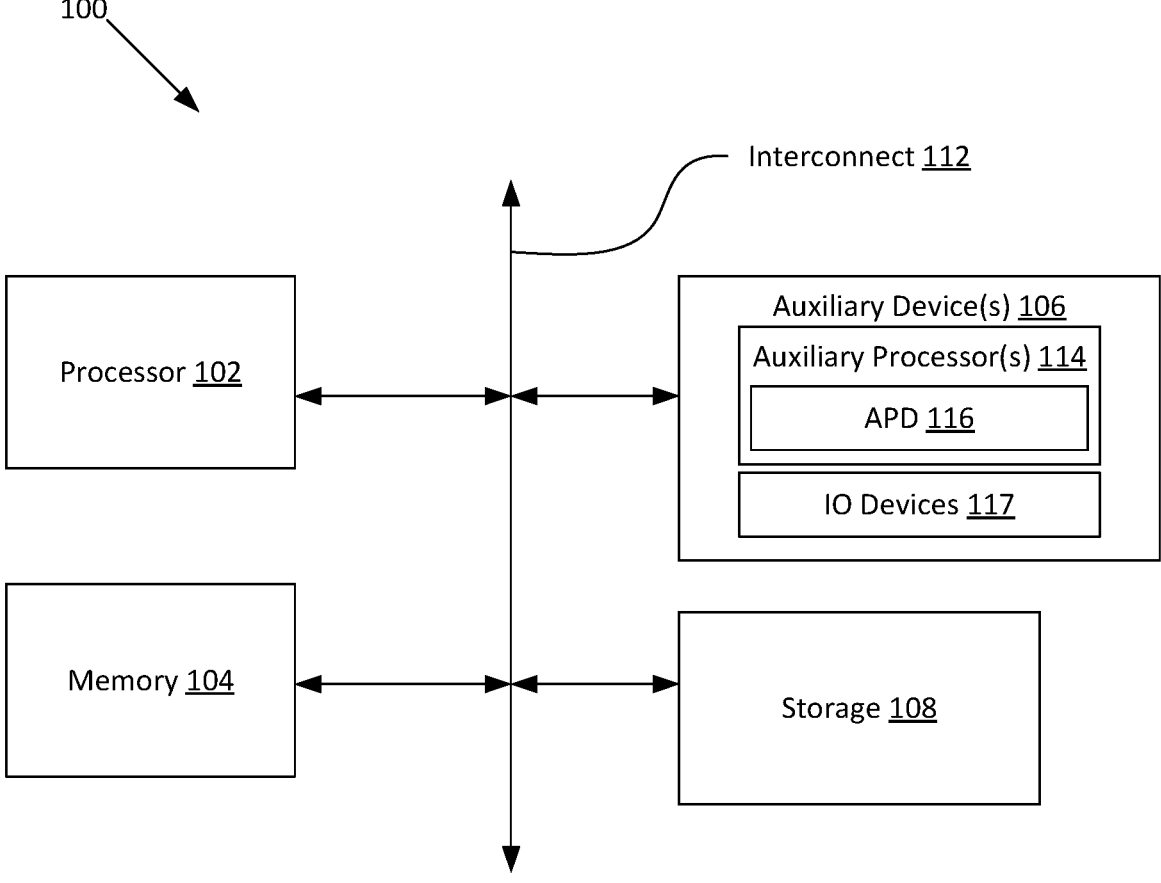
FIG. 1 is a block diagram of an example computing device in which one or more features of the disclosure can be implemented.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106, and a storage 108. An interconnect 112, which can be a bus, a combination of buses, and/or any other communication component, communicatively links the one or more processors 102, the memory 104, the one or more auxiliary devices 106, and the storage 108.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor.

The one or more auxiliary devices 106 includes an accelerated processing device ("APD") 116. The APD 116 may be coupled to a display device, which, in some examples, is a physical display device or a simulated device that uses a remote display protocol to show output. The APD 116 is configured to accept compute commands and/or graphics rendering commands from processor 102, to process those compute and graphics rendering commands, and, in some implementations, to provide pixel output to a display device for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and, optionally, configured to provide graphical output to a display device. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm perform the functionality described herein.

The one or more IO devices 117 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display device, a speaker, a printer, a haptic feedback device, one or more lights, an antenna, or a network connection (e.g., a wireless local area network card for transmission and/or reception of wireless IEEE 802 signals).

Figure 2:
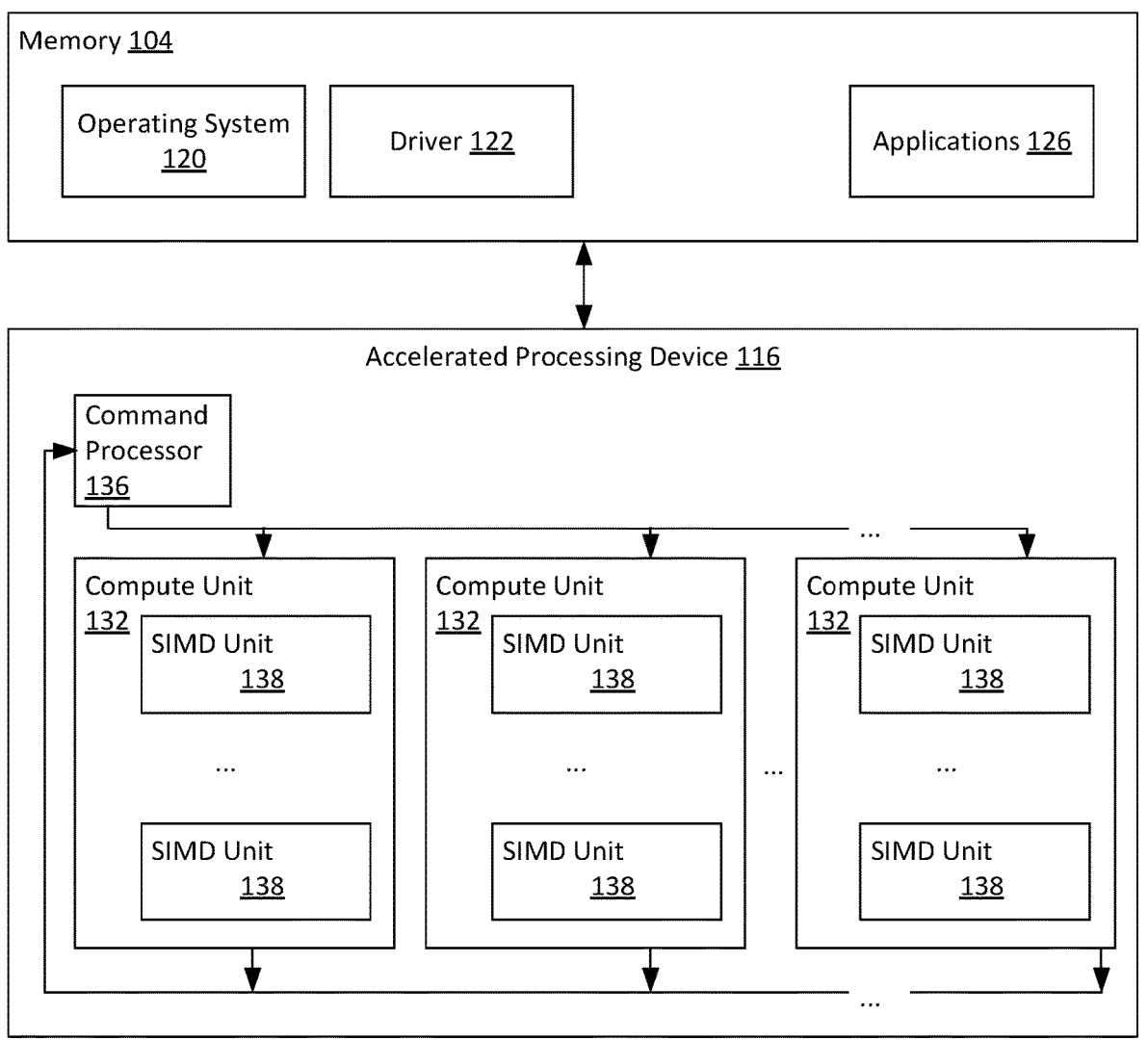
FIG. 2 illustrates details of the device of FIG. 1 and an accelerated processing device, according to an example.

FIG. 2 illustrates details of the device 100 and the APD 116, according to an example. The processor 102 (FIG. 1) executes an operating system 120, a driver 122 ("APD driver 122"), and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to a display device based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. A command processor 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
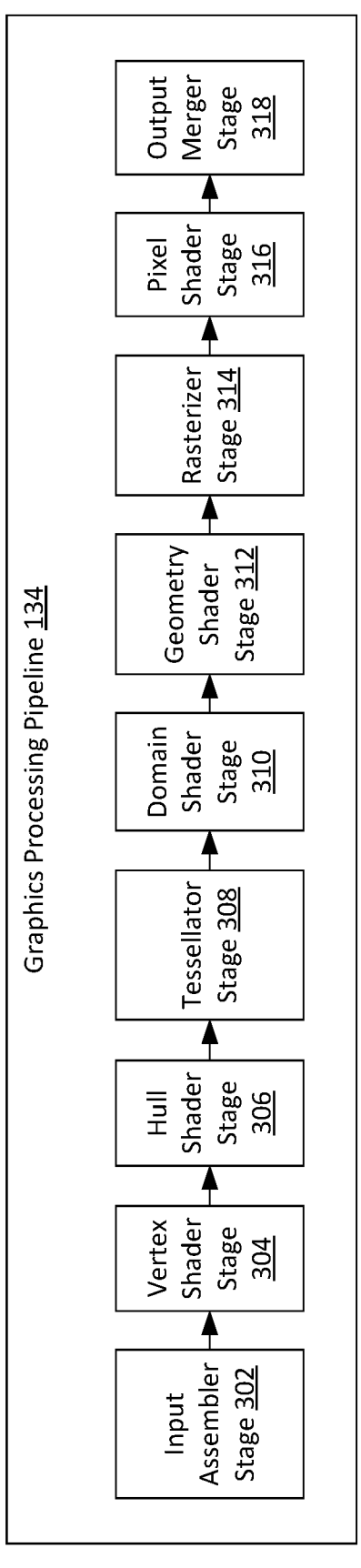
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132, that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-tocubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

It is possible to perform rendering in a "decoupled" manner. Decoupled rendering involves decoupling sample shading operations from other operations in the pipeline such as geometry processing and actual application of the shading results to the objects of a three-dimensional scene. In "typical" rendering such as forward rendering, a rendering pipeline processes triangles, transforming the vertices of such triangles from world space to screen space, then rasterizes the triangles, generating fragments for shading by the pixel shader. The pixel shader shades such fragments and outputs visible fragments to the pixel buffer for final output. As can be seen, in such rendering operations, the rate at which pixel shading operations occur is directly related to the rate at which the other operations of the pipeline occur. Advantage can be gained by decoupling the rate at which shading operations occur from the rate at which other operations (e.g., geometry operations) occur. Specifically, it can be possible to reduce the heavy workload of complex pixel shading operations while still generating frames at a high frame rate to reflect changes in geometry (e.g., camera position, rotation and scene geometry movement, rotation, and scaling) quickly over time.

FIG. 4 illustrates a set of decoupled shading operations 400, according to an example. The set of decoupled shading operations 400 includes a visibility pass and shade space marking operation 402, a shade space shading operation 404, and a reconstruction operation 406. In some examples, any of these operations is performed by one or more of software executing on a processor (such as the compute units 132), hardware (e.g., hard-wired circuitry), or a combination of software and hardware. In various examples, any of this software includes software executing on the processor 102 (e.g., an application), software executing in the APD 116 (e.g., shader programs), any other software, or any combination thereof. In various examples, the hardware includes any of the processors illustrated (e.g., processor 102, APD 116), or other circuitry or processors not illustrated. In this disclosure, phrases such as "the APD 116 performs a task" is sometimes used. This should be understood as meaning that any technically feasible element (e.g., the software or hardware) performs such task. In addition, although various operations are described as being performed by the APD 116, in other examples, such operations are performed by other elements such as the processor 102 or another hardware or software element not described.

Herein, where it is stated that software performs an operation, this should be understood as meaning that software executing on a processor performs the operation and thus that the processor performs that operation.

As a whole, the operations of FIG. 4 involve three "phases": a visibility phase, a shade space texture shading phase, and a reconstruction phase. The visibility phase determines visibility of entities within a scene. The shade space texture shading phase includes shading onto shade space texture for a scene. The shade space textures can be thought of as "canvases" to which shading operations are applied. The canvases are applied to the objects of a scene in the reconstruction phase. It is possible to decouple the rate at which the shade space shading phase occurs from the rate at which the reconstruction phase occurs, providing benefits such as reduce shading operation workload while still allowing for generating output frames at a high rate.

As described above, the objects of a scene each have one or more shade space textures. The shade space textures are mapped to the surfaces of such objects and colors in the shade space textures are applied to the objects during reconstruction 406. Utilizing the shade space textures in this manner allows for shading operations (e.g., the shade space shading operations 404) to occur in a "decoupled" manner as compared with the other rendering operations.

The visibility and shade space marking pass 402 involves determining and marking which portions of the shade space textures are visible in a scene. In some examples, the scene is defined by a camera and objects within the scene, as well as parameters for the objects. In some examples, a portion of a shade space texture is visible in the event that that portion appears in the final scene. In some examples, the portion appears in the final scene if the portion is within the camera view, faces the camera, and is not occluded by other geometry. In some examples, the visibility pass and shade space marking operation 402 results in generating groups of samples, such as tiles, that are to be shaded in the shade space shading operation 404. Each tile is a set of texture samples of a shade space texture that is rendered into in the shade space shading operation 404 and then applied to the geometry in the reconstruction 406 operation. In some examples, each such tile is a fixed size (e.g., 8×8 texture samples or "texels").

The shade space shading operation 404 includes shading the visible portions of the shade space textures. In some examples, these shading operations are operations that are typically applied in the pixel shader stage 316 in "conventional" rendering. Such operations include texture sampling (including filtering), applying lighting, and applying any other operations that would be performed in the pixel shader stage 316.

The reconstruction operation 406 includes applying the shade space textures to the geometry of the scene to result in a final image. In some examples, the reconstruction operation 406 processes the scene geometry through the world space pipeline, including applying the operations of the vertex shader stage 304 (e.g., vertex transforms from world-space to screen space) and the rasterizer stage 314 to generate fragments. The reconstruction operation 406 then includes applying the shade space texture to the fragments, e.g., via the pixel shader stage 316 or a compute shader, to produce a final scene which is output via the output merger stage 318. Note that the operations of the pixel shader stage 316 in reconstruction 406 are generally much simpler and less computationally intensive than the shading operations that occur in the shade space shading operations 404. For example, while the shade space shading operations 404 perform lighting, complex texture filtering, and other operations, the reconstruction operation 406 is able to avoid many such complex pixel shading operations. In one example, the reconstruction operation 406 performs texture sampling with relatively simple filtering and omits lighting and other complex operations.

As stated above, it is possible to apply the shade space shading operation 404 at a different frequency than the reconstruction operation 406. In other words, it is possible to use the information generated by the shade space operation 404 in multiple successive reconstruction operations 406 (or reconstruction "frames"). In another example, the spatial rate of shade space could be lower than the spatial rate of the final image. Thus, it is possible to reduce the computational workload of the complex shading operations 404 while still generating output frames relatively quickly. The decoupled shading operations 400 will now be described in greater detail.

FIG. 5 illustrates operations for the visibility pass and texture marking operations 402, according to an example. Herein, the term "visibility pass 402" is used interchangeably with "visibility pass and texture marking operations 402." The example visibility pass 402 is performed for a scene 502 which includes a number of objects 504. In addition, each object 504 has an associated shade space texture 506 which has a visible portion 508 and a non-visible portion 509. As can be seen, the example visibility pass 510 results in the designation of the visible portion 508 of the associated shade space texture 506.

In an example 512, the visibility pass 402 designates the visible portions 508 of the shade space textures 506 by generating tiles 514 that cover the visible portions in the following manner. The visibility pass 402 performs some of the operations of the graphics processing pipeline 134. Specifically, the visibility pass 402 generates tiles for the portions of the shade space texture 506 that are visible in the scene. Each tile 514 represents a portion of the shade space texture 506 that is to be shaded in the shade space shading operation 404. Tiles that are not generated are not shaded in the shade space operation 404.

In some examples, the visibility pass 402 generates tiles by using the graphics processing pipeline 134. More specifically, the geometry of the scene 502 is processed through the graphics processing pipeline 134. Information associating each fragment with a shade space texture flows through the graphics processing pipeline 134. When the final image is generated, this information is used to identify which portions of which shade space textures 506 are actually visible. More specifically, because only visible fragments exist in the final output image, the information associated with such fragments is used to determine which portions of the shade space textures 506 are visible.

Figure 6:
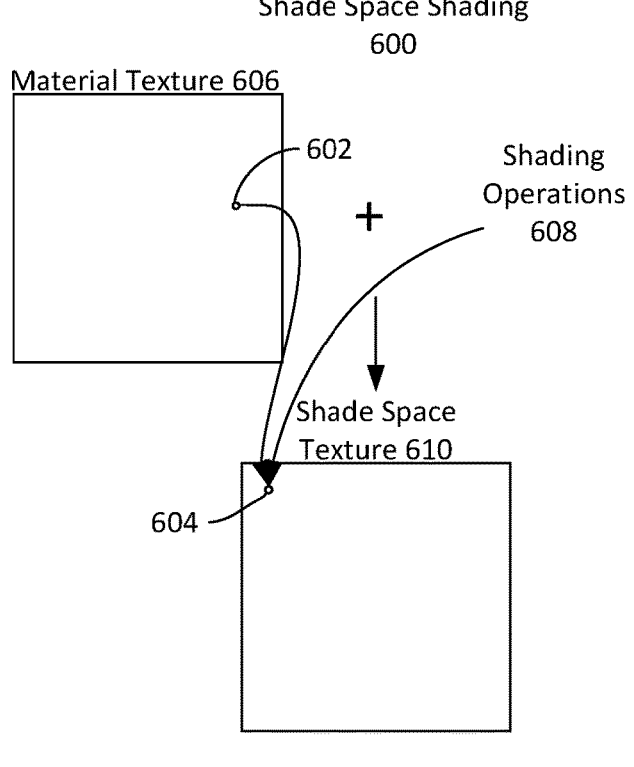
FIG. 6 illustrates example shade space shading operations for the shade space shading operations of FIG. 4.
Figure 7:
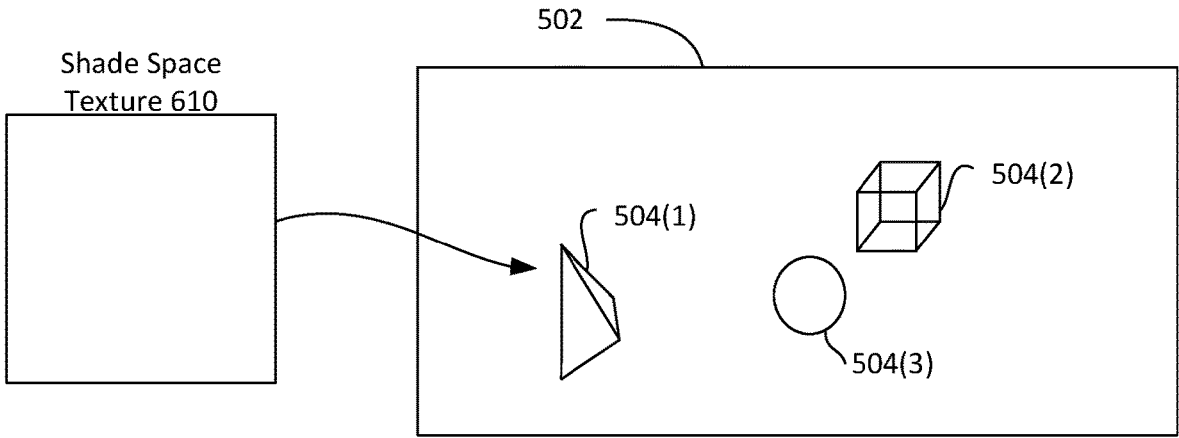
FIG. 7 illustrates an example reconstruction operation.

FIG. 6 illustrates example shade space shading operations 600 for the shade space shading operations 404 of FIG. 4. The APD 116 performs shade space shading 600 by sampling a material texture 606 within a sample area 602 to obtain a texture color and applying shading operations 608 (e.g., lighting and/or other operations) as a result to generate a shade space color sample 604 for the shade space texture 610. In some examples, the shade space shading operations 600 generates texels for the entirety of each of the tiles 514 that are generated as a result of the visibility pass 402. FIG. 7 illustrates an example reconstruction operation 700. In the reconstruction operation 700, the shade space texture 610 is applied to the objects 504 within the scene.

As described, the reconstruction operation 406 includes sampling from one or more shade space textures 610 to draw pixels to the output image (e.g., a final image to be presented to a display device or to be stored or saved elsewhere as an output image). When performing such texture sampling, it is beneficial to match the resolution of the texture being sampled to the resolution of the output image to the degree that such matching is possible. In general, one way to match these resolutions is by filtering samples from multiple different MIP levels of a texture pyramid together. An example filter that performs such operations is a trilinear filter. Such a filter combines samples from textures having different resolutions in order to attempt to match the resolution of the render target (i.e., the image to which the sampled texture is applied—the output image that incorporates the results of the texture sampling process). In an example, two textures of close resolution to that of the render target are sampled, and the results are blended. With the example of trilinear filtering, a texture filtering unit determines a level of detail for pixels of an output image and identifies two MIP levels based on the level of detail. In general, the level of detail reflects a comparison between the resolution of the output image and the rate of change of texture coordinates of a texture to be applied. This level of detail can have a fractional component. The texture filtering unit selects the MIP levels associated with integer values that are immediately above and below the level of detail, and obtains samples from those MIP levels. Then, the texture filtering unit blends those samples to obtain a final texture sample.

The use of trilinear filtering achieves two goals: obtaining a sample at a requested location (e.g., a sample position for the output image), where the sample location is not necessarily the same as any of the individual texels of the texture ("sample interpolation"), as well as sampling as if the source texture had approximately the same resolution as the surface to be textured ("frequency matching"). Sample interpolation is used because the position of the sample of the surface to be textured does not typically directly align with any of the positions of the texels of the texture applied to that surface. The interpolation combines multiple sample values of one or more source textures in order to obtain a sample at the appropriate location. In an example, a bilinear filter is applied by applying a weighted average to texture samples surrounding a sample location, where the weights are based on the distance between the sample location and the texture samples. The frequency matching is applied because, to avoid artifacts such as blurring or aliasing, it is best to attempt to match the resolution of the source texture to that of the surface to be textured, to the degree possible. By filtering together samples from multiple MIP levels, where the different MIP levels have different resolutions, a sample is generated as if the sample were sampled from a MIP level having a matching resolution to the resolution of the surface that is being textured. Trilinear filtering avoids abrupt changes in the MIP texture selection that otherwise could be visible as banding artifacts at the expense of sampling from multiple MIP levels and slightly blurrier portions of images.

Figure 8:
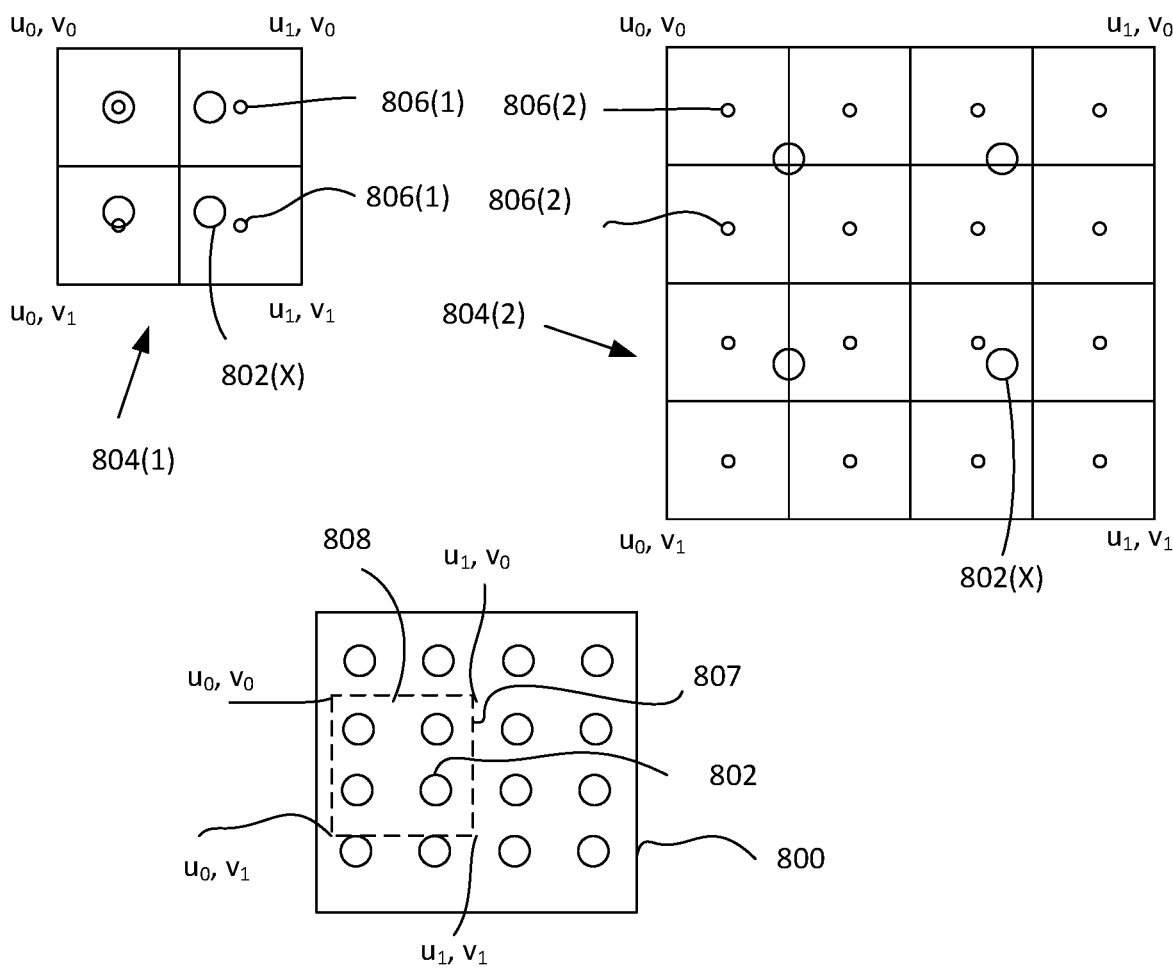
FIG. 8 illustrates an example of trilinear filtering.

FIG. 8 illustrates an example of trilinear filtering. Specifically, in FIG. 8, a trilinear filter is applied to determine a sample value for a sample 802 for a surface 800 to be textured based on a first MIP level texture 804(1) having a first MIP level and a second MIP level texture 804(2) having a second MIP level. It should be understood that the surface 800 may not be regular and aligned with the MIP pyramid to be textured from, and that various illustrated aspects of the correspondence between the MIP pyramid to be textured from and the surface 800 are for exemplary purposes only.

As stated, the texture filtering operation obtains a sample value for sample 802. A set of texture coordinates (u, v)

denotes the extents of a texture mapping area 808. For both the first MIP level texture 804(1) and the second MIP level texture 804(2), the texture coordinates (u, v) are associated with locations in those textures 804. The particular texture coordinate values shown ($u_0$, $v_0$, $u_1$, and $v_1$) define the extents of the illustrated portion of the first MIP level texture 804(1) and the second MIP level texture 804(2). Note that either or both of such textures may have portions beyond those coordinates, and those portions are not shown. Note that the first MIP level texture 804(1) and the second MIP level texture 804(2) both correspond to the same texture coordinates. The second MIP level texture 804(2) has a higher resolution than that of the first MIP level texture 804(1), meaning that the second MIP level texture 804(2) has more texture samples 860 than the first MIP level texture 804(1) in the region defined by texture coordinates $u_0$, $v_0$ to $u_1$, $v_1$.

In addition, the surface to be textured 800 has a portion of interest 807 having an area corresponding to the extents $u_0$, $v_0$ to $u_1$, $v_1$ of the textures. In other words, the four corners of the area of interest 807 in the coordinate texture space are the same as the four corners of the first MIP level texture 804(1) illustrated and those of the second MIP level texture 804(2). Texture operations involve obtaining a texture sample for a sample location of a pixel 802. The illustrated example is confined to the four sample locations 802 within the portion of interest 807, but it should be understood that similar operations could be applied to other portions of the surface to be textured 800. As can be seen, the frequency of the samples is different for each of the first MIP level texture 804(1), the second MIP level texture 804(2), and the surface to be textured 800. Specifically, the second MIP level texture 804(2) has a higher resolution than both the first MIP level texture 804(1) and the surface to be textured 800, and the surface to be textured 800 has a higher resolution than the first MIP level texture 804(1). The locations of the samples 802 of the surface to be texture 800 in both the first MIP level texture 804(1) and the second MIP level texture 804(2) are shown.

As stated above, trilinear filtering performs sample interpolation and frequency matching. Sample interpolation is performed by interpolating between different texture samples 806 to obtain a sample value for a sample location that may not line up with any particular texture sample 806. Frequency matching is approximated by blending the interpolated samples from different MIP levels, with a weight based on a fractional level of detail ("LOD") value. The fractional LOD value represents the difference in resolution between the surface to be textured 800 and the MIP levels. In the example shown, the resolution of the surface to be textured 800 is closer to that of the first MIP level texture 804(1), so the weight would reflect a greater contribution from the first MIP level texture 804(1) than from the second MIP level texture 804(2). This weighted blending represents the frequency match—by blending samples from different MIP levels together, a resolution that is different than either MIP level, which matches that of the surface to be textured 800, is achieved. In summary, trilinear filtering is a technique that generates samples for a surface to be textured by applying two separate operations to one or more source textures. The first operation, sample interpolation, obtains a texture sample at the location of the surface samples, rather than the texture samples. In trilinear filtering, a bilinear filter is applied to each source MIP level to obtain an interpolated sample for each such MIP level. The second operation, frequency matching, blends these samples together in a manner that attempts to match the frequency of the surface to be textured 800. This frequency can be thought of as embodied in the comparative resolution of the texture MIP levels and the surface to be textured 800. This additional operation attempts to provide a sample as if that sample were from a texture having a resolution that matched that of the surface to be textured 800. By blending from different MIP levels, trilinear filtering is able to achieve this.

An issue with trilinear filtering in the context of decoupled shading is that trilinear filtering requires multiple source textures of different MIP levels. This requirement means that the shade space shading pass 404 would need to shade multiple textures, of different MIP levels, for each portion of the output image that is visible (or at least for each portion for which frequency matching and sample interpolation is to be applied). In other words, the shade space shading pass 404 would need to shade more than one texture for each such portion of the output image, which represents a large amount of work. Due to this, a technique is provided herein that reduces the amount of shading needed at the shade space shading pass 404, while also providing a frequency matching filter.

The technique includes generating a texture that has a resolution at least as high as the resolution of the surface to be textured 800. The technique then includes applying a filter that performs both sample interpolation and frequency matching in a manner that does not require more than one source texture. This filter attenuates the frequency spectrum of the sampled content to give a result as if the texture from which sampling occurs had approximately the same resolution as the surface to be textured 800. Further, this sampling is performed without requiring multiple different source textures. Thus, the amount of work that needs to be performed in the shading space shading pass 404 is reduced as compared with a situation in which trilinear filtering is performed.

Figure 9:
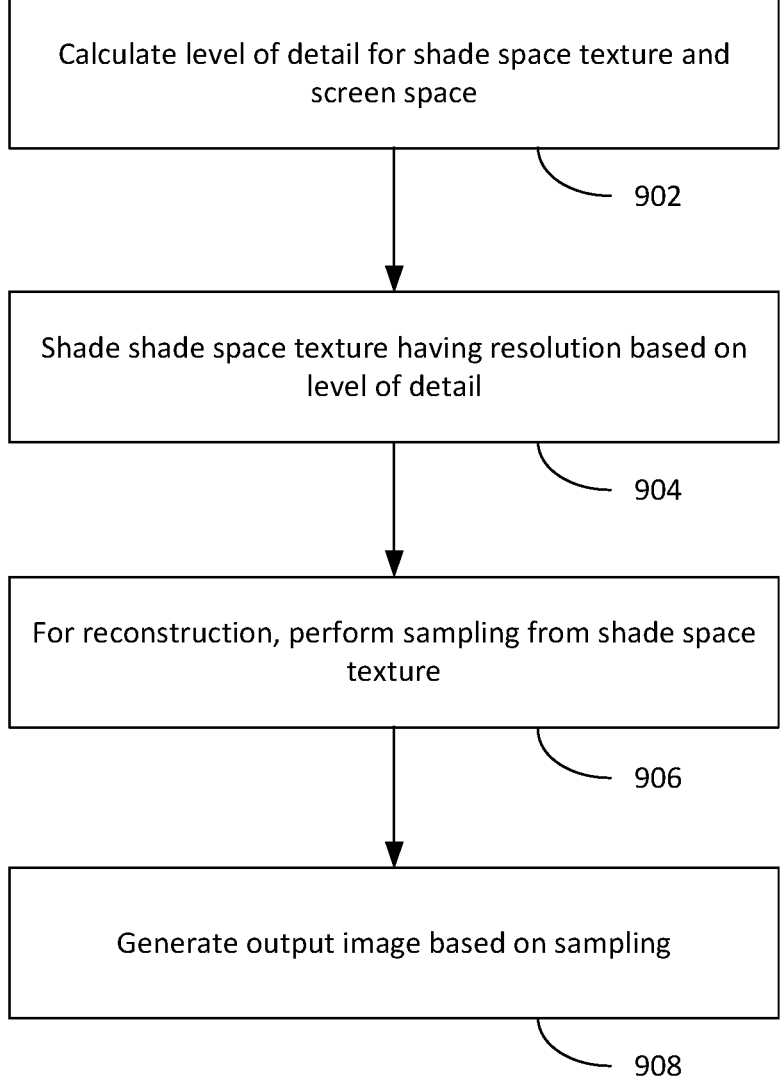
FIG. 9 is a flow diagram of a method for performing texture sampling, according to an example.

FIG. 9 is a flow diagram of a method 900 for performing texture sampling, according to an example. Although described with respect to the systems of FIGS. 1-8, those of skill in the art will understand that any system, configured to perform the steps in any technically feasible order, falls within the scope of the present disclosure.

At step 902, the visibility pass 402 or shade space shading pass 404 calculates a level of detail for the shade space texture and the screen space. The level of detail reflects a comparison between the resolution of the screen space (in which the final image is generated by the reconstruction pass 406) and the shade space shading texture. While a variety of techniques may be used to calculate level of detail, in general, level of detail calculation reflects the rate of change of the shade space texture coordinates with respect to the screen coordinates. In general, level of detail has an integer component and a fractional component. Each integer component represents a particular MIP level, and the fractional component reflects the degree to which the resolution of the screen space lies between two different MIP levels.

At step 904, the shade space shading pass 404 shades a shade space texture that has a resolution that is based on the level of detail. In examples, the resolution selected is the resolution associated with the higher of the MIP levels associated with the level of detail calculated at step 902. More specifically, as described above, the level of detail has an integer component and a fractional component. Thus there is a first integer value that is immediately lower than the level of detail value and a second integer value that is immediately higher than the level of detail value. Each such integer value is associated with a particular MIP level. The shade space shading pass 404 selects the integer value associated with the MIP level having a higher resolution than that specified by the level of detail integer plus fractional component. In other words, the MIP level that is selected is associated with the immediately "adjacent" integer level of detail. For instance, if the level of detail is 3.5, the level of detail selected for the shade space texture is 3.0, as this is "adjacent" to 3.5 and is the higher of the resolutions that are adjacent to 3.5. Another way to state this is that the MIP level that is selected is the floor function of the level of detail, where the floor function simply discards the fractional component of a fractional number. This allows the texture filtering that occurs to include a low pass filtering operation, which effectively reduces the resolution of the texture being sampled to that of the screen space. In some examples, the shade space shading pass 404 (as well as any other part of the decoupled shading operation) does not generate or shade a shade space texture for the MIP level whose integer LOD value represents a lower resolution than the resolution of the output image.

At steps 906 and 908, the reconstruction pass 406 performs sampling for from the shade space texture that was generated at step 904.

At step 906, the reconstruction pass 406 determines filter parameters for bandwidth control. Determining filter parameters is based on the fractional component of the level of detail. In some examples, the reconstruction pass 406 converts this fractional component into a "desired attenuation" by a closed-from equation or by using a look-up table. In some examples, the reconstruction pass 406 converts the "desired attenuation" to a sigma value for a Gaussian kernel using an equation or look up table. In some examples, the reconstruction pass 406 determines separate axis aligned control values for horizontal and vertical filtering as discussed elsewhere herein. In an example, the reconstruction pass 406 compresses a shade space pixel more in one direction than the other during reconstruction, resulting in an ellipsoid filter.

At step 908, the reconstruction pass 406 performs sampling from the shade space texture that was generated at step 904. This sampling includes sampling from one source texture. This sampling is different than trilinear filtering, which blends samples from multiple source textures to achieve frequency matching, as described elsewhere herein. In some examples, the sampling performs both sample interpolation (e.g., by blending multiple samples from different locations in the texture based on the location of the texture samples relative to a screen sample location (e.g., as in FIG. 8)) and frequency matching (e.g., by adjusting the blend weights to reduce the effective resolution as described elsewhere herein). In some examples, the filtering is performed using the filter parameters for the bandwidth control determined in step 906.

At step 910, the reconstruction pass 406 generates an output image based on the sampling of step 906. In various examples, this operation occurs as described elsewhere herein. In some examples, the reconstruction pass 406 applies the sample obtained at operation 906 to the appropriate location in the screen space to generate a value (e.g., color) for a pixel. In various examples, this operation is performed for a plurality of pixels of the output image, in order to generate the output image.

Figure 10:
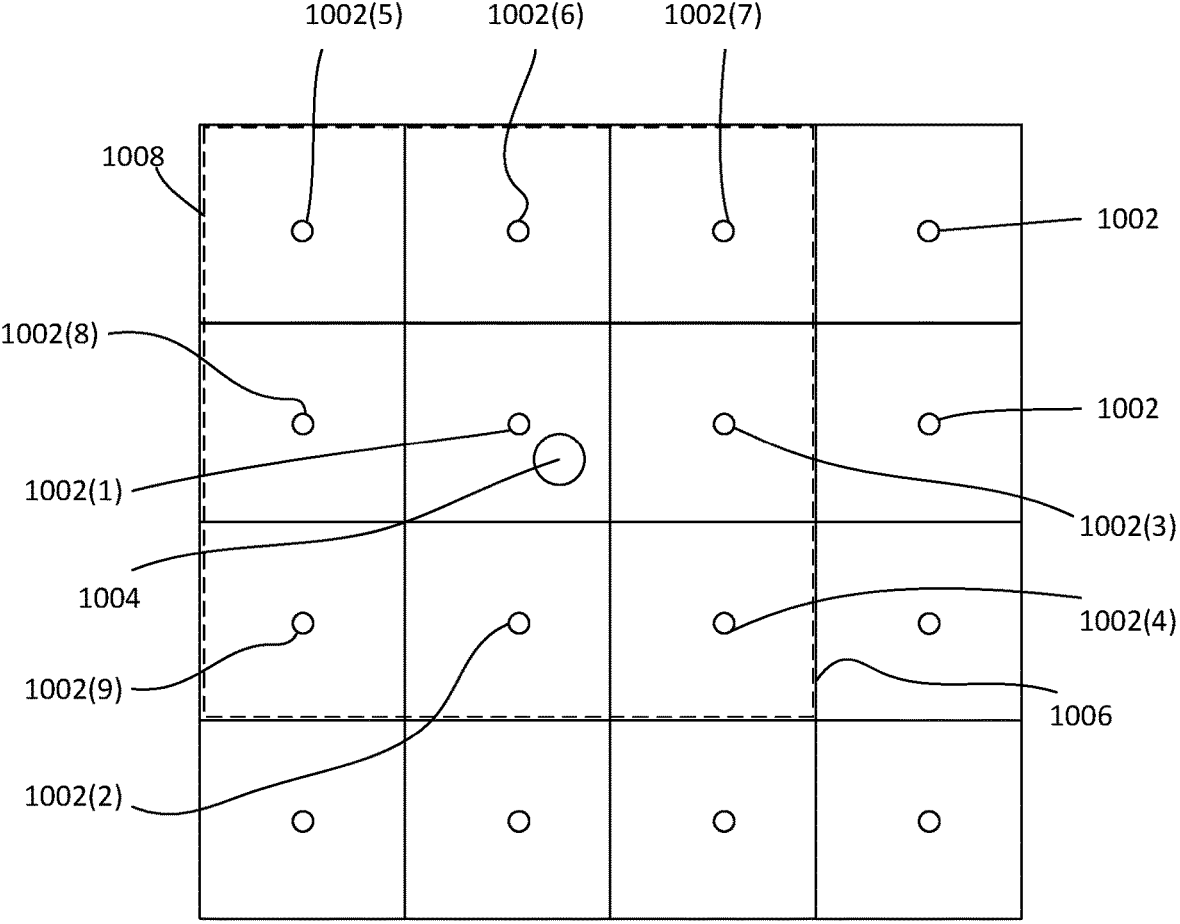
FIG. 10 illustrates an example filtering operation for step, according to an example.

FIG. 10 illustrates an example filtering operation for step 906, according to an example. This example is a gaussian filter, in which texture samples surrounding a screen sample location in the texture space are blended together in a weighted manner. In some examples, a Gaussian filter is applied to an area of 3×3 texels or larger. In other words, a Gaussian filter is typically a 3-tap filter. In such a filter, the center tap (the middle of the filter) is typically determined based on the integer position (floor) of the texel that is closest to the interpolated position in texture space. In other words, the middle texel of the filter is the closest texel to the sample position for the pixel to be textured, in the texture space. In some examples, the number of taps (the size of the filter) is defined at design time. In some examples, the number of taps is selected based on a consideration of a trade-off between cost and quality, as more taps are more expensive due to more arithmetic and more fetching. In some examples, the number of taps is adaptively selected at design time based on metrics or heuristics that attempt to optimize the cost to quality. Generally, better frequency response can be achieved with more filter taps. Additional filter taps can result in ringing of the output signal. This ringing can be mitigated by adaptively using less taps or using various de-ringing filters.

Further explanation is now provided by way of contrast with bilinear filtering. In bilinear filtering, the amount of attenuation that occurs when sampling is entirely uncontrolled. The frequency attenuation is not in any way related to what is needed based on LOD. In one example, if the MIP is almost the same scale as the image to be reconstructed, too much attenuation would be applied in some areas and/or situations. In some examples, the amount of attenuation changes as the position in the image changes. In other examples, the frequency attenuation provided by bilinear filtering is too little. In addition to the above, the frequency attenuation changes as the interpolation position changes. In an example, for interpolation at a position such as 0.1, the weights are 0.9, 0.1, and there would be little attenuation. Adjacent new pixels in the reconstructed image will have been filtered with different frequency attenuation, causing artifacts due to this inconsistency. More specifically, in bilinear filtering, the weight applied to each texture sample value is based on the distance from the sample to be textured to the texture sample locations. Interpolation occurs in two different directions (e.g., x and y), with the contribution of a particular sample being dependent on the distance of the sample to be textured to the texture samples in both directions. The weights in bilinear filtering are such that the texture sample values are interpolated. That is, the interpolated value in each direction is based only on the distance of the sample to be textured to the texture samples. In an example, a sample to be textured that is exactly at the same location as a texture sample would only have contribution from that sample. In another example, a sample to be textured that is equidistant from four texture samples would have equal contribution from those four different texture samples. This filter applies sample interpolation but does not apply any frequency matching, and again, the frequency attenuation applied by a bilinear filter is entirely uncontrolled.

By contrast, the gaussian filter 1006 illustrated in FIG. 10 applies both sample interpolation and frequency matching. In FIG. 10, a plurality of texture samples 1002 are illustrated within an example filter area 1008. In addition, a sample to be textured 1004 is illustrated. The gaussian filter 1006 of FIG. 10 includes a sigma parameter that modifies the contribution of any particular texture sample 1002 to the sample to be textured 1004 based on the distance of the texture sample 1002 to the sample to be textured 1004. Varying this sigma parameter varies the distance-based contribution of the texture samples to the sampled color for the sample to be textured 1004, which consequently varies the degree to which high frequency attenuation is applied. The higher the sigma value, the higher the contribution from samples that are farther away, and thus the greater the attenuation of the high frequencies. Conversely, the lower the sigma value, the lower the contribution from samples that are farther away, and thus the lower the attenuation of the high frequencies.

In the example of FIG. 10, the sample to be textured 1004 will receive contributions from texels 1002(1)-1002(9). Moreover, the weighting for interpolation is based on the distance from the sample to be textured 1004 to the texture samples 1002 as well as the sigma parameter.

Unlike with a bilinear filter, with a gaussian filter, the weighting applied to the texels 1002 depends on both the sample position and the sigma parameter, which controls the attenuation. Adjusting this sigma parameter in one direction increases the weighting for more distant texels 1002 and adjusting the sigma parameter in the opposite direction decreases this weighting. The final color is based on a weighted sum of the involved texture samples.

In some examples, the reconstruction pass (e.g., step 906) selects a sigma parameter that attenuates the sampled texture to have a frequency as if the source texture had a resolution corresponding to the actual level of detail of the surface to be textured. In other words, as described elsewhere herein, the surface to be textured has a particular level of detail that includes an integer component and a fractional component. The fractional component is an indication of the resolution of the surface to be textured as compared with the resolution associated with the immediately larger integer level of detail MIP and the immediately smaller integer level of detail MIP. Thus, by varying the sigma parameter based on this fractional value and sampling from the immediately higher resolution MIP level, the reconstruction pass 906 achieves frequency matching to a texture having a resolution that matches that of the surface to be textured. In other words, the reconstruction pass 906 samples from the MIP level corresponding to the immediately higher resolution level of detail, where the sampling is performed with a high frequency attenuation factor that causes the sampling to occur as if the source texture had a matching resolution to that of the surface to be textured. The reconstruction pass 906 sets the sigma parameter to perform this matching.

It should be understood that although a particular filter type-a Gaussian filter—is described, any filter type that performs high frequency attenuation to match the resolution of the surface to be textured can alternatively be used. Again, such a filter would perform sample interpolation as well as high frequency attenuation. The high frequency attenuation would have the sampling occur as if performed using a texture having a resolution that matches that of the surface to be textured. An example filter other than a Gaussian filter is a Lanczos filter, where the 'a' parameter controls the degree to which the high frequencies are attenuated. Any low pass filter with a parameter that controls frequency attenuation would be capable of performing such high frequency attenuation even when sampled from a single source texture (in contrast with trilinear filtering which requires two MIP levels).

In one alternative, the filter that is used is capable of attenuating the high frequencies to a different degree in each of the horizontal and vertical dimension. It is possible for the level of detail to be calculated independently for each such dimension. In such a situation, the fractional level of detail value can be different for each different direction. Thus, in such examples, the reconstruction operation 406 chooses a different attenuation factor for each such dimension.

In another alternative, the reconstruction operation 406 applies a non-circular (e.g., ellipsoidal) filter to sample different numbers of texture samples in different directions. It should be noted that the non-circular filter can have an orientation—e.g., the filter can have a direction that does not align with the axes of the texture or the reconstructed image. In some examples, this direction aligns with underlying features of the content represented in the texture. The size of the filter in each dimension is based on the level of detail for that dimension. In this situation, the reconstruction operation 406 would select a number of samples in each dimension to correspond to the higher texture level of detail (e.g., the integer level of detail value that corresponds to the immediately higher resolution than that which is indicated by the integer plus fractional value level of detail value) and attenuates in the given dimension based on the fractional level of detail value for that dimension, as described elsewhere herein.

Note that the reconstruction operation 406 is, in various examples, performed at a much higher rate than the shade space shading operation 404. The reconstruction operation 406 is able to use the texels of the shade space shading operation 404 multiple times after such texels are generated.

Figure 11:
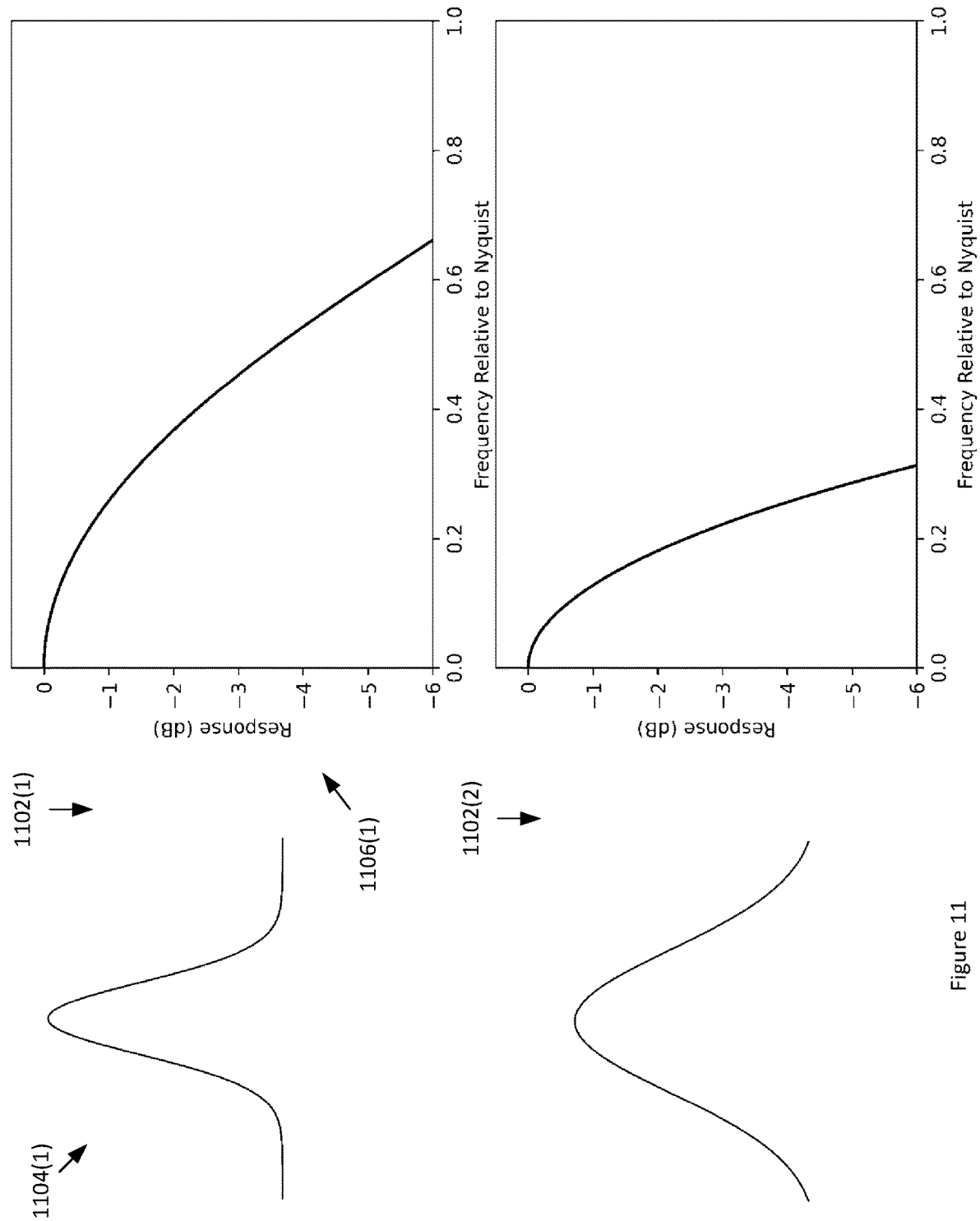
FIG. 11 illustrates Gaussian filters with two different sigma parameters, according to an example.

Additional example details regarding a Gaussian filter are illustrated in FIG. 11. In FIG. 11, Gaussian filters with two different sigma parameters are shown. A first filter 1102(1) illustrates a filter with a sigma parameter of 0.4 and a second filter 1102(2) illustrates a filter with a sigma parameter of 0.8.

The filter weight graphs 1104 represent the value of the weights applied to the texels, varying with distance to a center point. The midpoint of the graph represents the highest weight value applied, and the weight falls off with distance from the midpoint. The frequency response graphs 1106 represent the degree of attenuation based on frequency. As can be seen, as the frequency (given with respect to the Nyquist frequency) increases, a degree of attenuation is applied by the filter. The amount of attenuation applied to higher frequencies is increased as the sigma parameter increases. For example, there is more high frequency attenuation where sigma is 0.8 (graph 1102(2)) than where sigma is 0.4 (graph 1102(1)).

Regarding the filter 1102(1), the filter has a response of 0.65 relative to nyquist. The cut-off is −6 dB. This value causes frequencies that are higher than the cut off to be attenuated to perceptually acceptable levels. In some examples, this filter is appropriate when the reconstruction filter requires little attenuation of high frequencies in the signal spectrum. Regarding the filter 1102(2), this filter has a response of 0.3 relative to Nyquist. This means that the filter attenuates significantly more of the higher part of the frequency spectrum as compared with the filter 1102(1). In some examples, this filter is appropriate where the reconstruction filter requires a relatively high amount of attenuation of higher frequencies in the signal spectrum.

It should be understood that many variations are possible based on the disclosure herein. Although features and elements are described above in particular combinations, each feature or element can be used alone without the other features and elements or in various combinations with or without other features and elements.

Each of the units illustrated in the figures represent hardware circuitry configured to perform the operations described herein, software configured to perform the operations described herein, or a combination of software and hardware configured to perform the steps described herein. For example, the processor 102, memory 104, any of the auxiliary devices 106, the storage 108, the command processor 136, compute units 132, SIMD units 138, input assembler stage 302, vertex shader stage 304, hull shader stage 306, tessellator stage 308, domain shader stage 310, geometry shader stage 312, rasterizer stage 314, pixel shader stage 316, or output merger stage 318 are implemented fully in hardware, fully in software executing on processing units, or as a combination thereof. In various examples, such "hardware" includes any technically feasible form of electronic circuitry hardware, such as hard-wired circuitry, programmable digital or analog processors, configurable logic gates (such as would be present in a field programmable gate array), application-specific integrated circuits, or any other technically feasible type of hardware.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for rendering, the method comprising:
for a shade space texture and a level of detail for that shade space texture, shading the shade space texture, wherein the level of detail defines a resolution for the shade space texture;
converting a fractional component of the level of detail to an attenuation parameter; and
for a reconstruction operation, performing sampling from the shade space texture, the sampling including a high frequency attenuation of samples of the shade space texture, wherein the high frequency attenuation occurs to a degree that is based on the attenuation parameter.

2. The method of claim 1, further comprising generating an output image based on the sampling.

3. The method of claim 2, wherein generating the output image includes performing the sampling for each pixel of the output image.

4. The method of claim 1, wherein the level of detail includes an integer component and the fractional component.

5. The method of claim 4, wherein the resolution of the shade space texture is a next highest resolution MIP level corresponding to the level of detail.

6. The method of claim 4, wherein an amount of attenuation for the high frequency attenuation is based on the fractional component of the level of detail.

7. The method of claim 4, wherein the sampling includes a Gaussian function or a Lanczos function.

8. The method of claim 4, wherein the sampling includes a different degree of high frequency attenuation in a horizontal direction and a vertical direction.

9. The method of claim 4, wherein the sampling is performed using a non-circular filter area.

10. A system comprising:
a memory configured to store a shade space texture; and
a processor configured to:
for a shade space texture and a level of detail for that shade space texture, shade the shade space texture having a resolution based on the level of detail, wherein the level of detail defines a resolution for the shade space texture;
convert a fractional component of the level of detail to an attenuation parameter; and
for a reconstruction operation, perform sampling from the shade space texture, the sampling including a high frequency attenuation of samples of the shade space texture, wherein the high frequency attenuation occurs to a degree that is based on the attenuation parameter.

11. The system of claim 10, wherein the processor is further configured to generate an output image based on the sampling.

12. The system of claim 11, wherein generating the output image includes performing the sampling for each pixel of the output image.

13. The system of claim 10, wherein the level of detail includes an integer component and the fractional component.

14. The system of claim 13, wherein the resolution of the shade space texture is a next highest resolution MIP level corresponding to the level of detail.

15. The system of claim 13, wherein an amount of attenuation for the high frequency attenuation is based on the fractional component of the level of detail.

16. The system of claim 13, wherein the sampling includes a Gaussian function or a Lanczos function.

17. The system of claim 13, wherein the sampling includes a different degree of high frequency attenuation in a horizontal direction and a vertical direction.

18. The system of claim 13, wherein the sampling is performed using a non-circular filter area.

19. A non-transitory computer-readable medium storming instructions that, when executed by a processor, cause the processor to perform operations comprising:
for a shade space texture and a level of detail for that shade space texture, shading the shade space texture, wherein the level of detail defines a resolution for the shade space texture;
converting a fractional component of the level of detail to an attenuation parameter; and
for a reconstruction operation, performing sampling from the shade space texture, the sampling including a high frequency attenuation of samples of the shade space texture, wherein the high frequency attenuation occurs to a degree that is based on the attenuation parameter.

20. The non-transitory computer-readable medium of claim 19, wherein the operations further comprise generating an output image based on the sampling.

* * * * *